United States Patent

[11] 3,589,804

[72] Inventors John K. Taillon
 Sierra Madre;
 Lonial D. Boen, Pasadena, both of, Calif.
[21] Appl. No. 838,391
[22] Filed July 2, 1969
[45] Patented June 29, 1971
[73] Assignee Bell & Howell Company
 Chicago, Ill.

[54] LENS-CHANGING SYSTEM
 17 Claims, 4 Drawing Figs.
[52] U.S. Cl. .................................................. 352/140
[51] Int. Cl. ...................................................... G03b 3/00
[50] Field of Search............................................ 352/140,
 142; 95/44—47; 350/255, 181

[56] References Cited
 UNITED STATES PATENTS
1,879,737  9/1932  Del Riccio..................... 350/255 X
2,797,618  7/1957  Bloomberg et al............ 352/140 X
3,249,007  5/1966  Stauffer........................ 352/140 X
 FOREIGN PATENTS
1,118,603  11/1961  Germany...................... 352/142

Primary Examiner—Donald O. Woodiel
Attorney—David Weiss

ABSTRACT: Remotely controllable apparatus in combination with a projector, for permitting projection of screen images from either optically uncompressed or anamorphic film images. An anamorphic optical device is pivotally secured to support means which in turn is pivotally secured to the projector and rigidly securable thereto for supporting the anamorphic device in a first position outside the projector's optical path and alternatively in a second position in the optical path. Controllably actuable transport means is provided for pivotally transporting the anamorphic device from the first to the second position upon a remote actuation and alternatively from the second to the first position upon another remote actuation.

John K. Taillon,
Lonial D. Boen,
INVENTORS.
BY.

David Weiss

ATTORNEY.

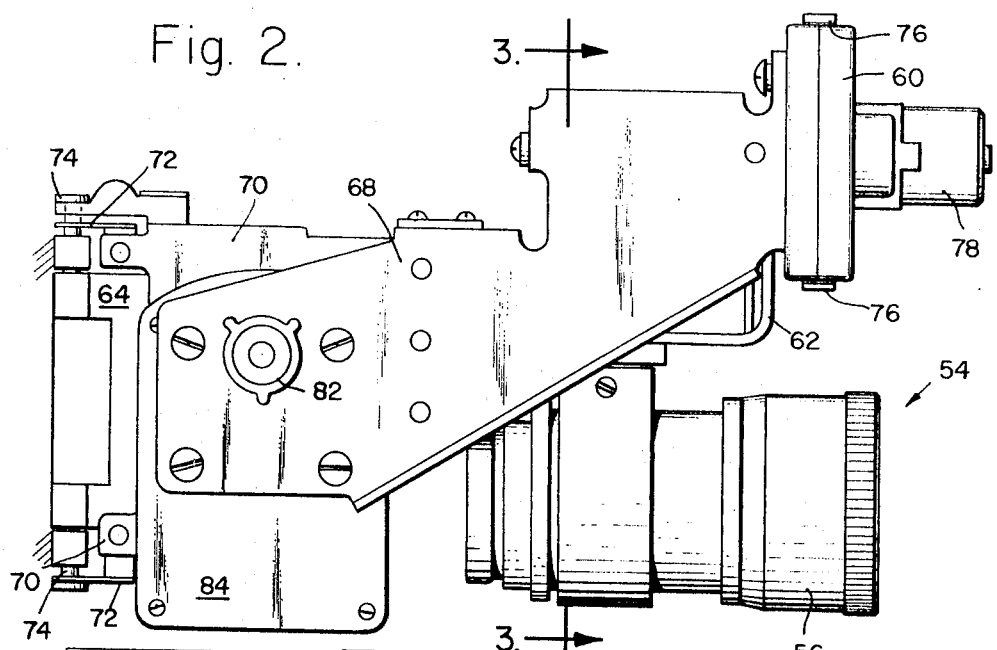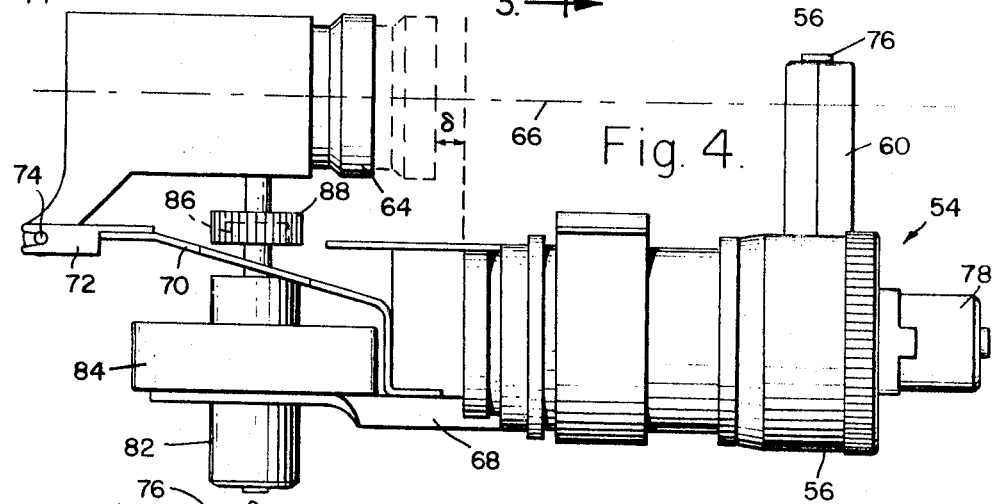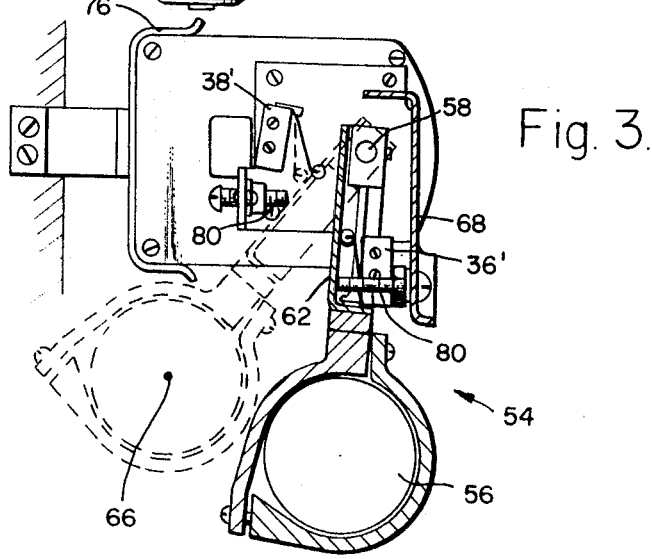

3,589,804

LENS-CHANGING SYSTEM

BACKGROUND OF THE INVENTION

1. Field of the Invention

This invention relates to motion picture projectors, and more particularly to remotely controlled apparatus for modifying the optical system of a projector for alternative presentation of wide-screen and normal projection.

2. Description of the Prior Art

The increasing trend toward automated operation of motion picture projector systems has made the display of motion pictures available to locations where this form of entertainment has previously been economically impractical. For example, motion picture programming for the entertainment of passengers aboard commercial aircraft has become an expected practice. The capability of such projector systems to be "operated" by a single person unskilled in projector operation has, in addition, permitted substantial increases in profits to owners of small theaters.

For these applications, projector systems utilizing 16 mm. film are economically utilized, since costly projector booths having special power, cooling and stringent fire prevention requirements which attend the light sources demanded for projection of larger film sizes (35 mm. and larger) are eliminated. Moreover, the use of 16 mm. film permits more than 4 hours of continuous programming to be shown from a single 30-inch diameter-reel containing over 9,000 feet of film. Such an extended period of projection continuity is desired for presenting a complete "program" in an uninterrupted manner with a single projector system.

A "program" generally consists of a plurality of separate "stories," usually a combination of at least one feature-length and one or more short-subject motion pictures. Typically, the various stories comprising a single program are not consistent in the type of optical system required for their projection, since one or more stories may have been processed for wide-screen projection while the others in the program have been processed for normal projection.

One type of commonly practiced wide-screen process causes the printed image on the film to be unnaturally compressed in the image horizontal direction, so that the optical system used during projection must horizontally magnify the projected image to restore the image width to its natural or uncompressed condition. The term "anamorphic" is applied to such systems, and the technique is commonly used to double the aspect ratio (i.e., the ratio of width to height) of the image projected at the screen with respect to the image printed on the film.

For example, a conventionally produced anamorphic print image has an aspect ratio of 1.33, while its screen image has an aspect ratio of 2.67. When the print image is not unnaturally compressed, the print aspect ratio of 1.33 is unchanged at the screen. An anamorphic print is characterized in that the film image is optically compressed in at least one dimension, requiring an anamorphic projection system to project an optically uncompressed screen image therefrom, in contrast to a "flat" print which is characterized in that the film image is optically uncompressed (i.e., not optically compressed) and is suitable for projection with a normal projection system.

In order to accommodate programs consisting of a combination of anamorphic and flat stories, therefore, the projector optical system must, in addition to its projection function, apply an anamorphic correction when anamorphic stories are being presented and prevent an anamorphic correction when flat stories are being presented. In the past, this has been accomplished by manually securing an anamorphic lens or prism system to the projection lens system (or "prime lens"), for anamorphic projection; for normal projection, the anamorphic attachment is manually unfastened from the prime lens and removed from the optical path. The manual operations which must be performed to effect lens changeover are, of course, inconsistent with the desire to present a complete program in an uninterrupted and automated manner.

One method of automating the lens changeover procedure, known to the projector art, provides a motorized two-lens system turret arrangement which is remotely or automatically activated to place either an anamorphically corrected projection lens system or a normal projection lens system in the optical path.

This provision of two separate and independently used sets of lenses is expensive, since a second prime lens is required as well as necessitating the inclusion of separate focusing apparatus for each lens set. Further, the weight and bulk of the dual-optical systems, together with their focusing apparatus, require provision for sufficiently large motor drive means and adequate support structure. The conversion of existing normal projection equipment to accommodate anamorphic presentation, using such a turret system, would ordinarily involve extensive and expensive modifications thereto.

SUMMARY OF THE INVENTION

The present invention provides remotely controlled apparatus for permitting a motion picture projector system to project optically uncompressed images on a screen from either optically uncompressed or anamorphic images on a film strip, without requiring the provision of two separate and independently used sets of lenses. An anamorphic optical device, such as an anamorphic lens, operates in optical combination with the projector's prime lens, without physical attachment between their respective housings.

The anamorphic device is automatically positionable in the projector's optical path and is automatically removed from the optical path, both operations being respectively actuated upon application of a remotely originating command signal. For example, the command signal can be generated in an automatic manner by the provision of suitable sensing means for sensing image type directly from the film strip, or by a manually controlled switching means (such as a pushbutton type switch) located at a remote control panel.

Focusing of the projected images can be adjusted by controllably moving the prime lens along the optical path, for projection from either flat or anamorphic prints. Accordingly, only one remotely controlled focusing apparatus is required, permitting relatively inexpensive conversion of existing normal projection equipment to accommodate anamorphic presentation.

BRIEF DESCRIPTION OF THE DRAWINGS

The novel features which are believed to be characteristic of the invention will be better understood from the following description considered in connection with the accompanying drawings in which the invention and a preferred embodiment thereof are illustrated by way of example. It is expressly understood, however, that the drawings are for the purpose of illustration and description only and are not intended as a definition of the limits of the invention.

FIG. 2 is a side elevation view of a preferred embodiment of a lens changing system in accordance with the present invention;

FIG. 3 is an elevation view of the preferred embodiment of FIG. 2, taken along the line 3-3 in the direction of the appended arrows; and FIG. 4 is a bottom view of the preferred embodiment of FIG. 2, shown in one position with respect to a projector's prime lens.

DETAILED DESCRIPTION OF THE INVENTION

Figure 1:
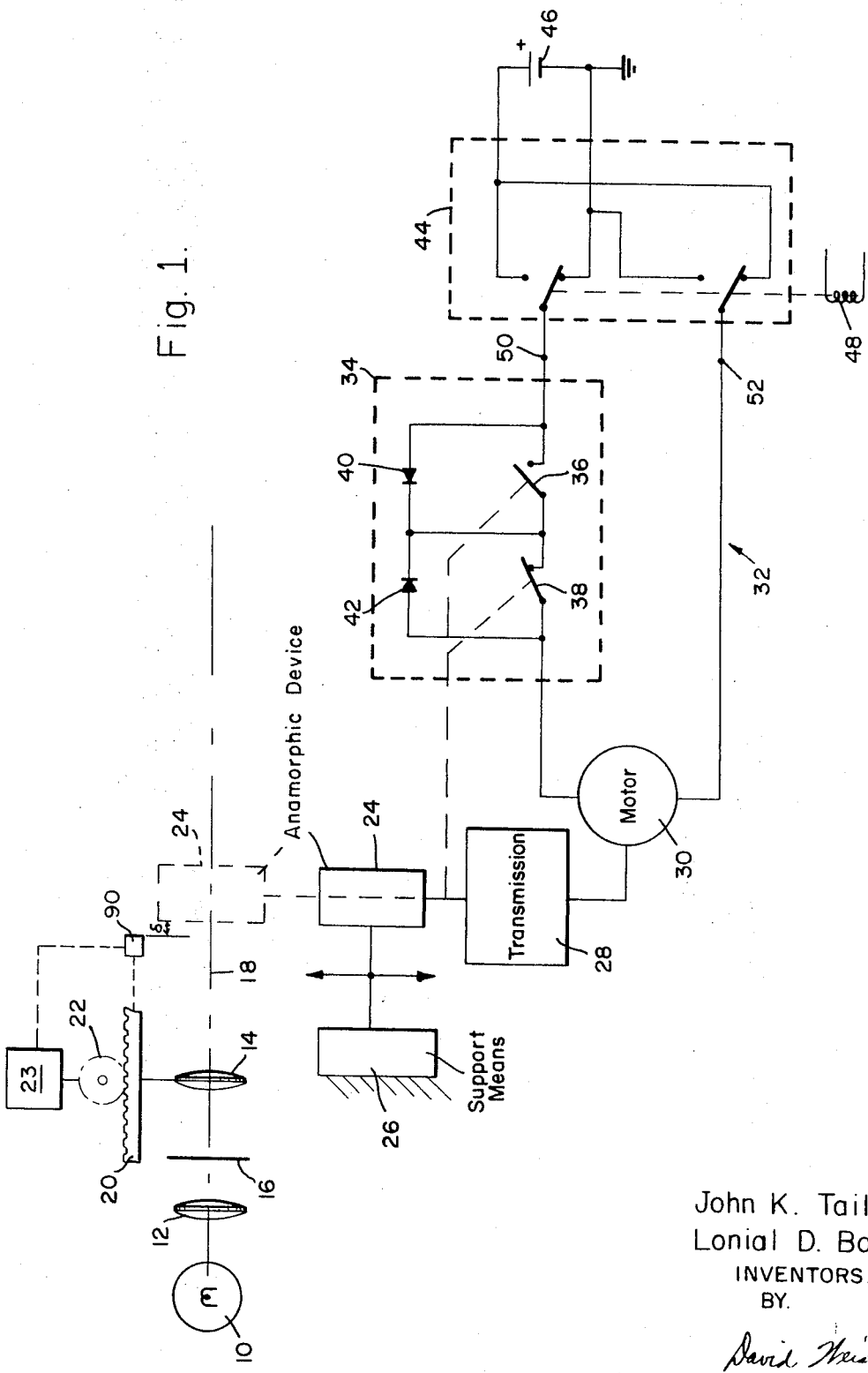
FIG. 1 is a part block, part circuit diagram of the invention shown in combination with normal projection apparatus.

Turning first to FIG. 1, various optical components of a conventional projector system for normal projection include a projector lamp 10, a condenser lens system 12 and a projector lens system indicated by a prime lens 14. Normal projection of optically uncompressed images printed on film 16 proceeds along an optical path having an axis indicated by a broken line 18. Focusing means for moving the prime lens 14 along the optical axis 18 is provided, indicated by a rack 20 and pinion 22 combination. Focusing of the prime lens 14 can be remotely controlled by suitable bidirectional drive means 23 for driving the pinion 22 upon actuation from a remotely located control panel.

An anamorphic optical device 24 is provided for optical combination with the prime lens 14, and is coupled to a support means 26 for supporting the device 24 while permitting movement between a first position outside the optical path to a second position in the optical path upon remote command. The first position of the anamorphic device 24 is indicated in FIG. 1 by the solid-line representation of the device 24, and the second position is indicated by representation of the device 24 in phantom.

The anamorphic device 24 is mechanically coupled to the output side of a transmission means 28, which restrains movement of the device 24 when the input side of the transmission means 28 is not driven. The transmission means 28, however, causes the anamorphic device 24 to move toward its second position when the transmission input is driven in a first rotational direction and toward its first position when driven in a second rotational direction opposite the first rotational direction.

The input side of the transmission means 28 can be driven by a DC motor 30, which in turn is bidirectionally driven in accordance with the polarity of a DC voltage applied across the terminals thereof through suitable circuit means 32. The circuit 32 includes position-responsive means 34 for causing the motor 30 to stop driving the transmission means 28 when the anamorphic device 24 enters either of the fist or second positions.

For example, the circuit 32 can include a first limit switch 36 series connected to a second limit switch 38, the switches 36, 38 being suitably positioned for actuation by the transmission means 28. The limit switches 36, 38 are respectively in closed configurations when the anamorphic device 24 is in neither the first nor the second position. The first limit switch 36 is caused to open, however, when the anamorphic device 24 is at its first position; similarly, the second limit switch 38 is caused to open when the anamorphic device 24 is at is second position.

Each of the limit switches 36, 38 is parallel-connected to respective blocking diodes 40, 42 oppositely poled with respect to one another. A double-pole double-throw switch arrangement 44 is connected to a DC voltage source 46 in such manner that the polarity of the excitation to the motor 30 can be changed upon remote command; e.g., through appropriate energization and deenergization of a relay solenoid 48.

When the circuit 32 is in the configuration shown in FIG. 1, junction 50 is at ground or common potential while junction 52 is connected to the positive terminal of the DC source 46. The first diode 40 is therefore reverse biased and nonconducting, and since the first limit switch 36 is open (the anamorphic device 24 being in its first position), the motor 30 is inactive and the transmission means 28 therefore restrains movement of the device 24. The anamorphic device 24 is therefore fixed in its first position by combination of the restraints imposed thereon by the undriven transmission means 28 and the support means 26.

In order to move the anamorphic device 24 from its first to its second position (in the optical path), the double-throw switches 44 are actuated (upon remote command) to reverse the voltages at the junctions 50, 52. The resulting forward biasing of the first diode 40 permits the motor 30 to be energized and driven in a first rotational direction, causing the transmission means 28 to move the anamorphic device 24 off its limit position, closing the first limit switch 36. When the anamorphic device 24 reaches its second position, the second limit switch 38 is actuated to open (while the second diode 42 is in a reverse-biased or nonconducting condition), causing the motor 30 to stop. The anamorphic device 24 is maintained in its second position by the previously discussed combined restraints supplied by the undriven transmission means 28 and the support means 26.

When it is desired to move the anamorphic device 24 out of the optical path, the double-throw switches 42 are again actuated upon remote command, applying a positive voltage to the second junction 52 with respect to the junction 50. Since the first limit switch 36 is in a closed configuration, the second diode 42 is forward-biased and conducting, causing the motor 30 to be driven in the second rotational direction. The second limit switch 38 thereupon closes, since the anamorphic device 24 is moved off its limit. When the anamorphic device 24 is driven to its second position (in the optical path), the first limit switch 36 is actuated to open; since the first diode 40 is reverse biased, the motor 30 is caused to stop. The anamorphic device 24 is maintained in its second position by the combined restraints of the undriven transmission means 28 and the support means 26.

It should be noted that the anamorphic device 24, when positioned in the optical path, is always at a predetermined distance from the plane of the film 16. Image focusing is accomplished by movement of the prime lens 22 along the optical axis 18 while the anamorphic device 24 is stationary and at a location "forward" of the prime lens 22; i.e., the prime lens is positioned between the film 16 and the anamorphic device 24.

The preferred embodiment of apparatus according to the present invention is best described upon simultaneous consideration of FIGS. 2, 3 and 4, wherein the same reference numerals are utilized to indicate correspondingly identical components.

Turning to FIGS. 2, 3 and 4, the preferred embodiment 54 includes an anamorphic optical device such as an anamorphic lens system 56, rigidly coupled to an output shaft 58 (FIG. 3) of a gear train 60 by means of a driving arm 62. The anamorphic lens 56 is shown in the first position out of the optical path of the projector; the projector prime lens 64 is shown in FIG. 4, and the center of the optical path is indicated by its optical axis 66. The anamorphic lens 56 is shown in its second position in the optical path in the phantom representation of FIG. 3.

The housing of the gear train 60 is rigidly mounted to a frame member 68 which includes a mounting arm 70 provided with mounting brackets 72 which are pivotably mounted to coaxial pins 75 retained by the projector. The coaxial pins 74 can further support the housing of the prime lens 64 (as shown in FIG. 4).

A spring-type clip 76 is mounted to the projector, for releasably retaining the housing of the gear train 60 such that the optical axis of the anamorphic lens 56 is maintained parallel to the projector optical axis 66. When the housing of the gear train 60 is released from the clip 76, the apparatus 54 can be pivoted about the pins 74 when desired, providing ease of access to the projector.

The housing of a DC motor 78 is rigidly attached to the housing of the gear train 60, the motor shaft driving the input of the gear train 60 in either of two rotational directions in accordance with the polarity of the driving voltage to the motor, as discussed above with respect to FIG. 1. The circuit means 32 (shown in FIG. 1) is utilized with the preferred mechanical apparatus of the present invention, and the operation of the preferred embodiment 54 will be described with reference thereto.

The operation of the preferred embodiment 54 is best described upon specific consideration of FIG. 3. When the anamorphic lens 56 is in its first position out of the projector optical path (as shown by the solid-line representation), the driving arm 62 is in actuating engagement with a first microswitch 36' which operatively corresponds to the first limit switch 36 of FIG. 1. When the circuit 32 responds to a remote command signal for reversing the polarity of the motor drive voltage, the driving arm 62 is pivotally driven by the gear train output shaft 58 until the driving arm actuates a second microswitch 38' operatively corresponding to the second limit switch 38. The locations of the microswitches 36', 38' are, or course, predetermined for requiring respective actuation thereof during times when the anamorphic lens 56 enters the corresponding first and second positions. In order to prevent the anamorphic lens 56 from overshooting the first and second positions, stop means such as appropriately positioned screws 80 are affixed to the frame member 68.

Movement of the anamorphic lens 56 from its second position (in the optical path) to its first position proceeds in accordance with a reversal of the above-described operation, and as discussed with respect to FIG. 1.

Focus drive apparatus can be mounted to the frame member 68, for controllably moving the housing containing the prime lens 64 along the optical path, thereby controlling focus of the screen images. For example, a second DC motor 82 and gear train 84 combination can be mounted to the frame member 68 such that an output pinion gear 86 is bidirectionally driven in accordance with manipulation of a rocker switch (not shown) situated at a remote control panel. The pinion gear 86 is positioned to mesh with an input gear 88 provided by the focusing apparatus of the prime lens 64, when the frame member 68 is rigidly secured to the projector; the movable housing containing the prime lens 64 is caused to move in response thereto.

In order to assure that the prime lens 64 is not overdriven in its "forward" direction (i.e., toward the anamorphic lens 56) to extend into the space occupied by the anamorphic lens 56 when in its second position, suitable position-responsive means 90 (FIG. 1) can be provided, for limiting forward movement of the prime lens 64 to a position representing a predetermined minimum separation δ between the housings of the prime lens 64 and the anamorphic lens 56. For example, the focus drive means 23 (FIG. 1) can include a circuit similar to the circuit 32 for driving the second DC motor 82. One of the limit switches of such similar circuit, however, can be included by the position responsive means 90 and actuable to open when the axial distance between the prime lens housing and the anamorphic lens housing equals the predetermined minimum separation δ.

Thus, there has been described a preferred embodiment of lens changing apparatus for modifying a projector to permit projection of normal images at a screen from either optically uncompressed or anamorphic images on a film strip. Other embodiments of the present invention and modifications of the embodiment herein presented may be developed without departing from the essential characteristics thereof.

Accordingly, the invention should be limited only by the scope of the claims appended below.

What we claim is:

1. In motion picture projector apparatus having an optical path, the combination comprising:
    an optical projection system in the optical path for projecting optically uncompressed images on a screen from optically uncompressed images on a film strip, said projection system including focus adjustment means for adjusting focus of said screen images;
    an anamorphic device for optically modifying said optical projection system to project optically uncompressed images on the screen from anamorphic images on the film strip when said anamorphic device is positioned in the optical path; and
    remotely controlled means for pivotally positioning said anamorphic device in the optical path and alternatively for pivotally positioning said anamorphic device outside the optical path.

2. In combination with a projector having an optical path for projection of screen images from optically uncompressed film images, apparatus for modifying the projector to permit alternative projection of screen images from anamorphic film images, comprising:
    an anamorphic optical device;
    support means pivotally secureable to the projector, said support means adapted to be rigidly secured to the projector for supporting said device in a first position outside the optical path and alternatively in a second position in the optical path; and
    controllably actuable transport means, for transporting said device from said first position to said second position upon an actuation and alternatively from said second position to said first position upon another actuation.

3. The apparatus according to claim 2, above, wherein said transport means is actuated in response to an applied command signal.

4. The apparatus according to claim 3, above, further including remotely controlled means for generating said command signal and for applying said command signal to said transport means for actuation thereof.

5. In combination with a projector having an optical path for projection of screen images from optically uncompressed film images, apparatus for modifying the projector to permit alternative projection of screen images from anamorphic film images, comprising:
    an anamorphic optical device;
    support means pivotally secureable to the projector, said support means adapted to be rigidly secured to the projector for supporting said device for movement between a first position outside the optical path and a second position in the optical path;
    transmission means, for restraining movement of said device when not driven, and for moving said device toward said second position when driven in a first rotational direction and alternatively toward said first position when driven in a second rotational direction opposite said first rotational direction; and
    drive means responsive to an applied command signal for driving said transmission means in an alternate one of said directions, and including position-responsive means for causing said drive means to stop driving said transmission means when said device enters either of said positions.

6. The apparatus according to claim 5, above, further including focus drive means on said support means for cooperation with a projection lens system supplied by the projector, for driving said projection lens system along the optical path to adjust focus of the projected screen images.

7. The apparatus according to claim 6, above, wherein the projection lens system includes position-responsive means for cooperation with said focus drive means, for causing said focus drive means to stop driving said projection lens system toward said anamorphic optical device when said system is at a position representing a predetermined minimum separation between said system and said device.

8. In combination with a projector having an optical path for projection of screen images from optically uncompressed film images, apparatus for modifying the projector to permit alternative projection of screen images from anamorphic film images, comprising the combination of:
    a frame member adapted to be rigidly secured to the projector;
    motor means having a housing rigidly secured to said frame member, and an output shaft;
    an anamorphic optical device;
    an arm member rigidly securing said device to said output shaft for pivotal movement of said device upon rotation of said output shaft, for moving said device from a first position outside the optical path to a second position in the optical path when said output shaft is driven to rotate in a first direction, and alternatively to said first position from said second position when said output shaft is rotationally driven in a second direction opposite said first direction; and
    circuit means connected to said motor means and responsive to an applied command signal for driving said output shaft in an alternate one of said directions, and including position-responsive means for causing said motor means to stop driving said output shaft when said device enters either of said positions.

9. The apparatus according to claim 8, above, wherein said output shaft has a longitudinal dimension parallel to the optical path and said anamorphic device has an optical axis parallel to said optical path, when said frame member is rigidly secured to the projector.

10. The apparatus according to claim 8, above, wherein said motor means includes a direct-current motor connected to said circuit means, and a gear train drivable by said direct-current motor and including said output shaft.

11. The apparatus according to claim 8, above, wherein said frame member includes first securing means cooperative with the projector for pivotally mounting said frame to the projector, and second securing means cooperative with the projector for releasably constraining said frame from movement with respect to the projector.

12. In a motion picture projector having an optical path, the combination comprising:
projection means in the optical path for projecting images from a film strip, and including drivable means for adjusting focus of the projected images;
a frame member secured to the projector;
drive means secured to said frame member for controllably driving said drivable means when coupled thereto;
anamorphic means for horizontally magnifying said projected images when positioned in the optical path forward of said projector means;
motor means secured to said frame member and having an output shaft;
an arm member rigidly securing said anamorphic means to said output shaft for pivotal movement of said anamorphic means upon rotation of said output shaft, for moving said anamorphic means from a first position outside the optical path to a second position in the optical path forward of said projector means when said output shaft is driven to rotate in a first position, and alternatively to said first position from said second position when said output shaft is rotationally driven in a second direction opposite said first direction; and
remotely controlled circuit means connected to said second motor means for driving said output shaft in an alternate one of said directions, and including position-responsive means for causing said second motor means to stop driving said output shaft when said anamorphic means enters either of said positions.

13. The combination according to claim 12, above, wherein said projection means includes a prime lens having a housing movable along the optical path by said drivable means, and said anamorphic means includes a housing rigidly secured to said arm member, the combination further including
position-responsive means cooperating with said drivable means and said drive means when coupled, for limiting forward movement of said prime lens housing to a position representing a predetermined minimum separation between said housings.

14. The combination according to claim 12, above, wherein said motor means includes a direct-current motor connected to said circuit means, and a gear train drivable by said direct-current motor and including said output shaft.

15. The combination according to claim 12, above, wherein said output shaft has a longitudinal dimension and said frame member is pivotally secured to the projector and adapted to be rigidly secured to the projector such that said output shaft is longitudinally parallel to the optical path.

16. The combination according to claim 15, above, wherein said anamorphic lens has a optical axis parallel to said optical path when said frame member is rigidly secured to the projector.

17. The combination according to claim 15, above, wherein said drive means is coupled to said drivable means when said frame member is rigidly secured to the projector.